US011319051B2

(12) United States Patent
Mohammed et al.

(10) Patent No.: US 11,319,051 B2
(45) Date of Patent: May 3, 2022

(54) STIFFENED COMPOSITE RIBS (71) Applicant: The Boeing Company, Chicago, IL (US)

(72) Inventors: Anil A. Mohammed, Redmond, WA (US); Daniel H Fletcher, Lake Forest Park, WA (US); Michael R Rush, Edmonds, WA (US); Kenneth Temiyasathit, Seattle, WA (US)

(73) Assignee: The Boeing Company, Chicago, IL (US)

( * ) Notice: Subject to any disclaimer, the term of this patent is extended or adjusted under 35 U.S.C. 154(b) by 292 days.

(21) Appl. No.: 16/733,472

(22) Filed: Jan. 3, 2020

(65) Prior Publication Data

US 2021/0206471 A1    Jul. 8, 2021

(51) Int. Cl.
*B64C 3/18*    (2006.01)
*B64C 3/26*    (2006.01)

(52) U.S. Cl.
CPC .............. *B64C 3/187* (2013.01); *B64C 3/185* (2013.01); *B64C 3/26* (2013.01)

(58) Field of Classification Search
CPC ........... B64C 3/18; B64C 3/182; B64C 3/185; B64C 3/187
USPC ........................................................ 52/719
See application file for complete search history.

(56) References Cited

U.S. PATENT DOCUMENTS

| | | | | |
|---|---|---|---|---|
| 2,367,750 A | * | 1/1945 | Berkow | B64C 3/00 244/123.2 |
| 2009/0084899 A1 | * | 4/2009 | Kismarton | B64C 3/182 244/123.1 |
| 2009/0189019 A1 | * | 7/2009 | Shortman | B64C 3/187 244/123.1 |
| 2009/0272848 A1 | * | 11/2009 | Munday | B64C 3/26 244/131 |
| 2013/0062467 A1 | * | 3/2013 | Soenarjo | C08K 5/14 244/123.1 |
| 2013/0157017 A1 | * | 6/2013 | Guillemaut | B64C 1/061 428/172 |
| 2013/0216766 A1 | * | 8/2013 | Tanaka | B32B 5/26 428/99 |
| 2015/0183506 A1 | * | 7/2015 | Garcia Martin et al. | B29C 70/443 244/123.1 |
| 2015/0298790 A1 | * | 10/2015 | Vanderhoek | B64C 3/26 244/123.1 |
| 2016/0009365 A1 | * | 1/2016 | Marks | B64C 3/18 244/123.1 |

(Continued)

*Primary Examiner* — Richard R. Green
*Assistant Examiner* — Arfan Y. Sinaki
(74) *Attorney, Agent, or Firm* — Parsons Behle & Latimer (57) ABSTRACT A side of body carbon fiber reinforced polymer (CFRP) composite rib assembly that is formed by connecting an aft CFRP rib web, a middle CFRP rib web, and a forward CFRP rib web together. The side of body CFRP rib assembly includes a plurality of stiffeners connected to the aft CFRP rib web, the middle CFRP rib web, or the forward CFRP rib web. A first stiffener connects the aft CFRP rib web with the middle CFRP rib web and a second stiffener connected the forward CFRP rib web to the middle CFRP rib web. The stiffeners may be connected via fasteners or may be co-bonded or co-cured with the side of body CFRP rib web. The stiffeners connected to the side of body CFRP rib assembly may include more than one shape and may be aluminum, a thermoset, and/or a thermoplastic.

20 Claims, 5 Drawing Sheets (56) References Cited

U.S. PATENT DOCUMENTS

| | | | |
|---|---|---|---|
| 2016/0046361 A1* | 2/2016 | Dan-Jumbo | B64C 3/182 |
| | | | 244/87 |
| 2016/0207607 A1* | 7/2016 | Charles | B64C 1/12 |
| 2016/0318597 A1* | 11/2016 | Kent | B64C 3/26 |
| 2016/0325822 A1* | 11/2016 | Mosqueira | B64C 5/02 |
| 2018/0072399 A1* | 3/2018 | Walker | B64C 3/187 |
| 2018/0072400 A1* | 3/2018 | Deobald | B29C 66/73756 |
| 2018/0135683 A1* | 5/2018 | Sisco | C25D 7/00 |
| 2019/0055000 A1* | 2/2019 | Barakatain | B64F 5/10 |
| 2019/0161156 A1* | 5/2019 | Batalla | B64C 3/187 |
| 2019/0217942 A1* | 7/2019 | Kooiman | B64C 29/0033 |
| 2020/0140054 A1* | 5/2020 | Osborne | B29C 66/61 |
| 2020/0216162 A1* | 7/2020 | Graham | B64C 3/26 |
| 2021/0039349 A1* | 2/2021 | Gurvich | E04C 2/3405 |

* cited by examiner

STIFFENED COMPOSITE RIBS

BACKGROUND

Field of the Disclosure

The examples described herein relate to apparatus, systems, and methods of stiffened carbon fiber reinforced polymer (CFRP) composite side of body ribs.

Description of the Related Art

Present side of body ribs installed connected to the wing box of an aircraft are typically a monolithic or built-up aluminum rib configuration. One reason for the use of an aluminum side of body rib is to match the thermal expansion of the wing box, which also was typically aluminum. However, aluminum side of body ribs potential present a thermal expansion mismatch for aircraft that utilizes a CFRP wing box. The wing side of body rib of aircraft often experience high fatigue loads, which may result in a side of body rib made of aluminum that is not cost effective due to the added weight required to meet the high fatigue load requirements. The use of an aluminum side of body rib may be inefficient and/or too costly when used in combination with a CFRP wing box. Other disadvantages may exist.

SUMMARY

The present disclosure is directed to apparatus, systems, and methods of stiffened CFRP side of body ribs.

One example of the present disclosure is an apparatus that includes an aft CFRP rib web, a middle CFRP rib web, and a forward CFRP rib web. The apparatus includes a plurality of stiffeners, wherein individual stiffeners of the plurality of stiffeners are connected to the aft CFRP rib web, the middle CFRP rib web, or the forward CFRP rib web. The aft CFRP rib web and the middle CFRP rib web are connected to a first stiffener of the plurality of stiffeners. The middle CFRP rib web and the forward CFRP rib web are connected to a second stiffener of the plurality of stiffeners. The aft CFRP rib web, the middle CFRP rib web, and the forward CFRP rib web form a side of body CFRP rib assembly.

The individual stiffeners of the plurality of stiffeners may be connected to the aft CFRP rib web, the middle CFRP rib web, or the forward CFRP rib web via fasteners or being co-bonded or co-cured with the CFRP rib webs. The first stiffener may be a first aluminum T-shaped stiffener having a first aft flange and a first forward flange. Fasteners may connect the aft CFRP rib web to the first aft flange and fasteners may connect the middle CFRP rib web to the first forward flange. The second stiffener may be a second aluminum T-shaped stiffener having a second aft flange and a second forward flange. Fasteners may connect the middle CFRP rib web to the second aft flange. Fasteners may connect the forward CFRP rib web to the second forward flange.

The fasteners may be interference fit fasteners. An exterior of the interference fit fasteners may include stripes of a coating separated by non-coated stripes. The side of body CFRP rib assembly may have a longitudinal length with each of the plurality of stiffeners being substantially perpendicular to the longitudinal length. The plurality of stiffeners may include stiffeners comprised of a first material and stiffeners comprised of a second material that differs from the first material. The first material may be aluminum and the second material may be a thermoset or a thermoplastic.

The aluminum stiffeners may include T-shaped stiffeners and J-shaped stiffeners. The thermoplastic or thermoset stiffeners may comprise Z-shaped stiffeners. The thermoplastic or thermoset stiffeners may comprise L-shaped stiffeners connected to Z-shaped stiffeners. The plurality of stiffeners may include at least a first shape and a second shape. The first shape may be a J-shaped stiffener and the second shape may be a T-shaped stiffener.

One example of the present disclosure is a system that includes a CFRP wing box and a side of body CFRP rib assembly having a longitudinal length connected to the CFRP wing box. The side of body CFRP rib assembly includes an aft CFRP rib web connected to a middle CFRP rib web connected to a forward CFRP rib web. The system includes a plurality of stiffeners connected to the side of body CFRP rib assembly, wherein the individual stiffeners of the plurality of stiffeners are substantially perpendicular to the longitudinal length.

The system may include an upper chord connected to the CFRP wing box, a lower chord connected to the CFRP wing box, a rear spar fitting connected to the CFRP wing box, and a front spar fitting connected to the CFRP wing box. The aft CFRP rib web may be connected to the CFRP wing box via being connected to the upper chord, rear spar fitting and the lower chord. The middle CFRP rib web may be connected to the CFRP wing box via being connected to the upper chord and the lower chord. The forward CFRP rib web may be connected to the CFRP wing box via being connected to the upper chord, the front spar fitting, and the lower chord.

The system may include a plurality of interference fit fasteners having an exterior that has stripes of coating separated by non-coated stripes. A first portion of the plurality of interference fit fasteners may be connected the aft CFRP rib web to the upper chord, rear spar fitting, and lower chord. A second portion of the plurality of interference fir fasteners may connect the middle CFRP rib web to the upper chord and the lower chord. A third portion of the plurality of interference fit fasteners may connected the forward CFRP rib web to the upper chord, the front spar fitting, and the lower chord.

The plurality of stiffeners may include aluminum J-shaped stiffeners connected to the aft CFRP rib web. The plurality of stiffeners may include a first aluminum T-shaped stiffener connected to both the aft CFRP rib web and the middle CFRP rib web. The plurality of stiffeners may include a second aluminum T-shaped stiffer connected to both the middle CFRP rib web and the forward CFRP rib web. The plurality of stiffeners may include thermoplastic stiffeners connected to the middle CFRP rib web. The plurality of stiffeners may include thermoplastic stiffeners connected to the forward CFRP rib web. The thermoplastic stiffeners may be Z-shaped stiffeners or C-channel shaped stiffeners. The thermoplastic stiffeners may be L-shaped stiffeners connected to Z-shaped stiffeners.

One example of the present disclose is method that includes providing an aft carbon fiber reinforced polymer (CFRP) rib web, a middle CFRP rib web, and a forward CFRP rib web. Various process may be used to provide the aft CFRP rib web, the middle CFRP rib web, and the forward CFRP rib web. For example, the method may include forming a side of body CFRP rib web and separating the side of body CFRP rib web into an aft CFRP rib web, a middle CFRP rib web, and a forward CFRP rib web. The method includes connecting stiffeners to the aft CFRP rib web, connecting stiffeners to the middle CFRP rib web, and connecting stiffeners to the forward CFRP rib web. The stiffeners include stiffeners comprised of a first material and stiffeners comprising of a second material that differs from the first material.

The method may include connecting the aft CFRP rib web to a wing box and connecting the forward CFRP rib web to the wing box, wherein an opening is formed between the aft CFRP rib web and the forward CFRP rib web. The method may include connecting the middle CFRP rib web to the wing box. The method may include connecting the middle CFRP rib web to a first T-shaped aluminum stiffener to connect the middle CFRP rib web to the aft CFRP rib web via the first T-shaped aluminum stiffener. The method may include connecting the middle CFRP rib web to a second T-shaped aluminum stiffener to connect the middle CFRP rib web to the forward CFRP rib web via the second T-shaped aluminum stiffener.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the scope of the disclosure as defined by the appended claims.

DETAILED DESCRIPTION

Figure 1:
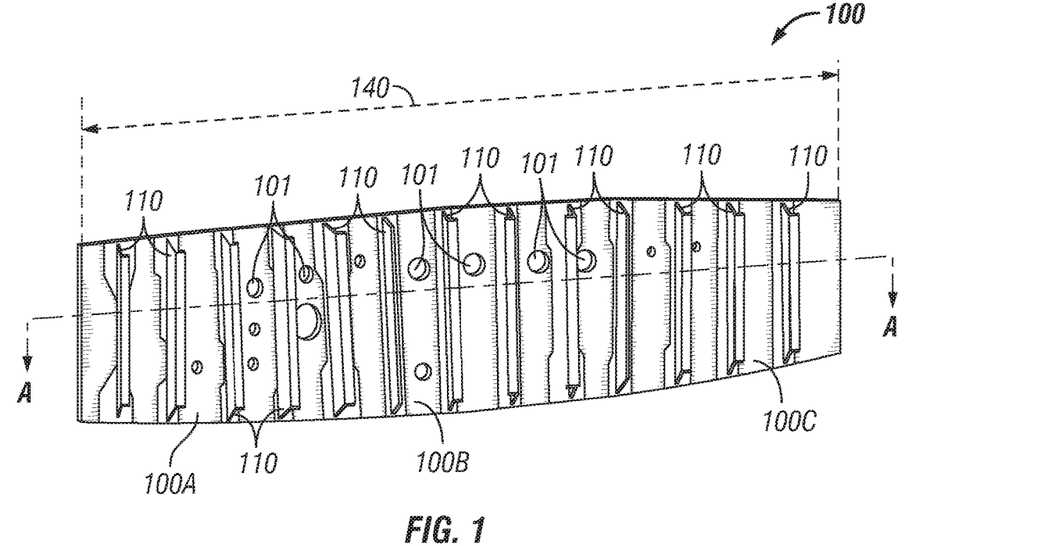
FIG. 1 is a schematic showing one example of a side of body CFRP rib web formed from an aft CFRP rib web, a middle CFRP rib web, and a forward CFRP rib web.

FIG. 1 shows an example of a side of body CFRP rib assembly 100. The side of body CFRP rib assembly 100 includes an aft CFRP rib web 100A, a middle CFRP rib web 100B, and a forward CFRP rib web 100C. The CFRP rib assembly 100 may be formed as a single rib web and then cut, or separated, into three portions or components, namely, the aft CFRP rib web 100A, the middle CFRP rib web 100B, and the forward CFRP rib web 100C. Alternatively, the aft CFRP rib web 100A, the middle CFRP rib web 100B, and the forward CFRP rib web 100C may be formed separately and then connected together, as discussed herein, to form the side of body CFRP rib assembly 100. Having the side of body CFRP rib assembly 100 being formed from three separate portions may facilitate the installation of the side of body CFRP rib assembly 100 into an aircraft as discussed herein. The side of body CFRP rib assembly 100 includes a plurality of apertures 101 that permits the passage of various lines through the side of body CFRP rib assembly 100.

The side of body CFRP rib assembly 100 has a longitudinal length 140 with a plurality of stiffeners 110 connected to the CFRP rib assembly 100. Each of the plurality of stiffeners 110 are connected to the side of body CFRP rib assembly 100 in an orientation that is substantially perpendicular to longitudinal length 140 of the side of body CFRP rib assembly 100. The side of body CFRP rib assembly 100 is configured to be connected to a wing box 200 (shown in FIG. 9) of an aircraft. The wing box 200 may a CFRP wing box. When the side of body CFRP rib assembly 100 is connected to the wing box 200 of an aircraft, the side of body CFRP rib assembly 100 may be subjected to compression due to wing dihedral and bending during operation of the aircraft. The side of body CFRP rib assembly 100 may also be subjected to shear due to wing torsion as illustrated by the arrows substantially parallel with the longitudinal length 140 of the side of body CFRP rib assembly 100. The plurality of stiffeners 110 connected to the side of body CFRP rib assembly 100 stiffen and reinforce the side of body CFRP rib assembly 100 as would be appreciated by one of ordinary skill in the art having the benefit of this disclosure.

The numbers, size, orientation, and/or configuration of the stiffeners are shown in FIG. 1 for illustrative purposes and may be varied depending on the application as would be appreciated by one of ordinary skill in the art having the benefit of this disclosure. The individual stiffeners of the plurality of stiffeners 110 may be formed from include more than one material such as, but not limited to, aluminum, a thermoplastic, or a thermoset. For example, stiffeners connected to the aft CFRP rib web 100A may be aluminum stiffeners and many of the stiffeners connected to the middle CFRP rib web 100B and the forward CFRP rib web 100C may be a thermoset or a thermoplastic. In one example, each of the stiffeners may be a thermoplastic or a thermoset material. The individual stiffeners of the plurality of stiffeners 110 may be formed in more than one shape. For example, J-shaped stiffeners may be connected to the aft CFRP rib web 100A and Z-shaped stiffeners may be connected to the middle CFRP rib web 100B and the forward CFRP rib web 100C with two T-shaped stiffeners connecting the aft CFRP rib web 100A with the middle CFRP rib web 100B and connecting the middle CFRP rib web 100B with the forward CFRP rib web 100C.

Figure 2:
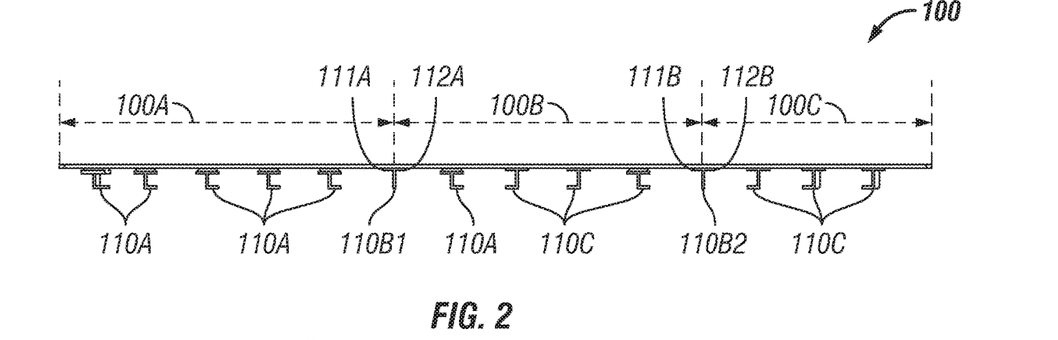
FIG. 2 is a schematic showing the cross section (A-A) view of the side of body CFRP rib web formed from an aft CFRP rib web, a middle CFRP rib web, and a forward CFRP rib web shown in FIG. 1.

FIG. 2 shows the cross section (A-A) view of the side of body CFRP rib assembly 100 of FIG. 1. The side of body CFRP rib assembly 100 includes an aft CFRP rib web 100A connected to a middle CFRP rib web 100B connected to a forward CFRP rib web 100C. A plurality of stiffeners, generally referred to as 110 as in FIG. 1, are connected to the side of body CFRP rib assembly 100. As discussed above, the plurality of stiffeners 110 may include individual stiffeners having different shapes and being made from different materials. Aluminum J-shaped stiffeners 110A are connected to the aft CFRP rib web 100A as well as to the middle CFRP rib web 100B.

A first T-shaped stiffener 110B1 includes a first aft flange 111A and a first forward flange 112A. A second T-shaped stiffener 110B2 includes a second aft flange 111B and a second forward flange 112B. The aft CFRP rib web 100A may be connected to the middle CFRP rib web 100B via the first T-shaped stiffener 110B1. Specifically, the aft CFRP rib web 100A may be connected to the first aft flange 111A of the first T-shaped stiffener 110B1 and the middle CFRP rib web 100B may be connected to the first forward flange 112A of the first T-shaped stiffener 110B1. The middle CFRP rib web 100B may be connected to the forward CFRP rib web 100C via the second T-shaped stiffener 110B2. Specifically, the middle CFRP rib web 100B may be connected to the second aft flange 111B of the second T-shaped stiffener 110B2 and the forward CFRP rib web 100C may be connected to the second forward flange 112B of the second T-shaped stiffener 110B2.

Thermoset or thermoplastic stiffeners 110C may be connected to the middle CFRP rib web 100B and may be connected to the forward CFRP rib web 100C. The stiffeners, generally 110, may be connected to the side of body CFRP rib assembly 100 by various mechanisms as would be appreciated by one of ordinary skill in the art having the benefit. For example, fasteners 300 (shown in FIG. 11) may be used to connect each individual stiffener 110 of the plurality of the stiffeners to a respective portion of the side of body CFRP rib assembly 100. The fasteners 300 may be interference fit fasteners. Alternatively, the stiffeners 110 may be co-bonded to or co-cured with the side of body CFRP rib assembly 100 or the aft CFRP rib web 100A, the middle CFRP rib web 100B, or the forward CFRP rib web 100C.

Figure 3:
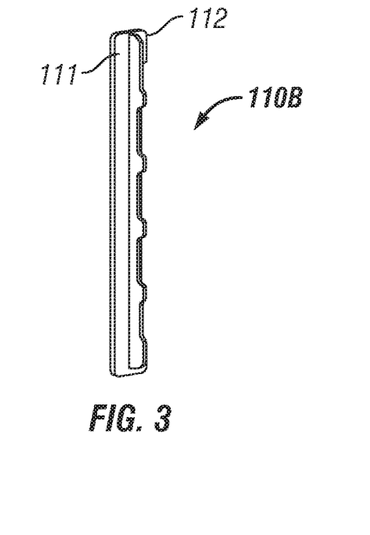
FIG. 3 shows an example of a stiffener that may be used on a side of body CFRP rib web.
Figure 4:
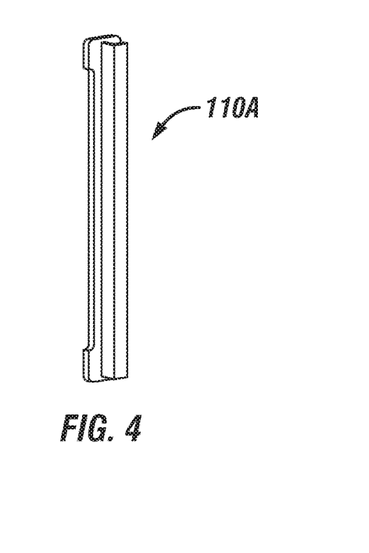
FIG. 4 shows an example of a stiffener that may be used on a side of body CFRP rib web.
Figure 5:
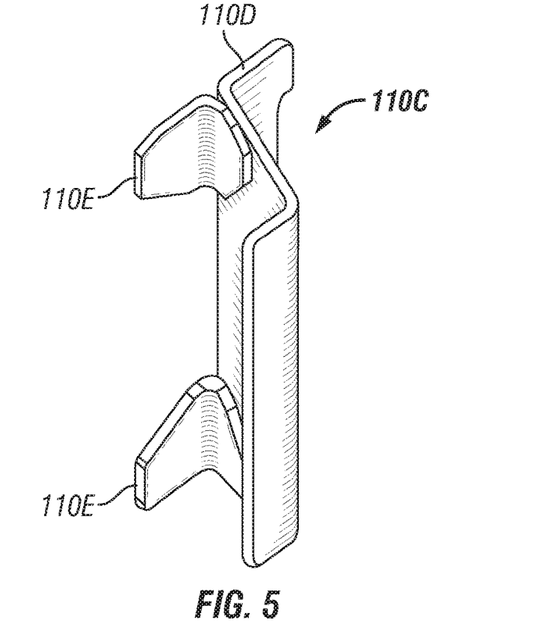
FIG. 5 shows an example of a stiffener that may be used on a side of body CFRP rib web.
Figure 6:
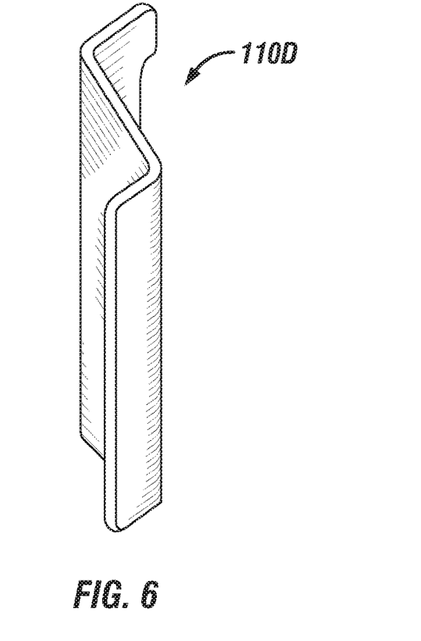
FIG. 6 shows an example of a stiffener that may be used on a side of body CFRP rib web.
Figure 7A:
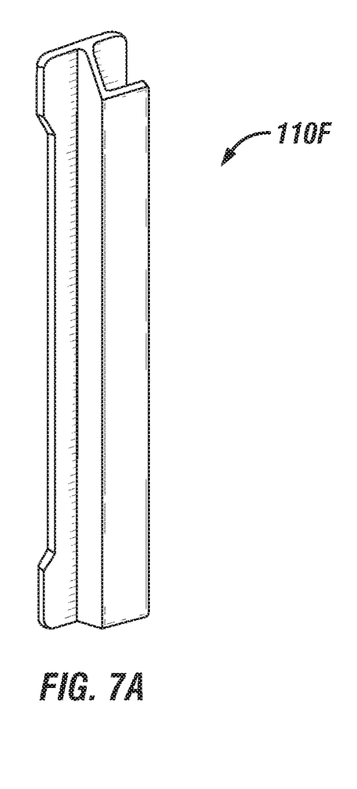
FIGS. 7A and 7B show an example of a stiffener that may be used on a side of body CFRP rib web.
Figure 7B:
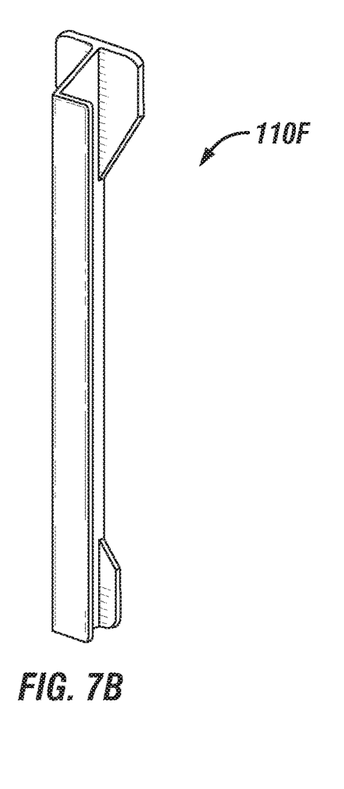
Figure 8:
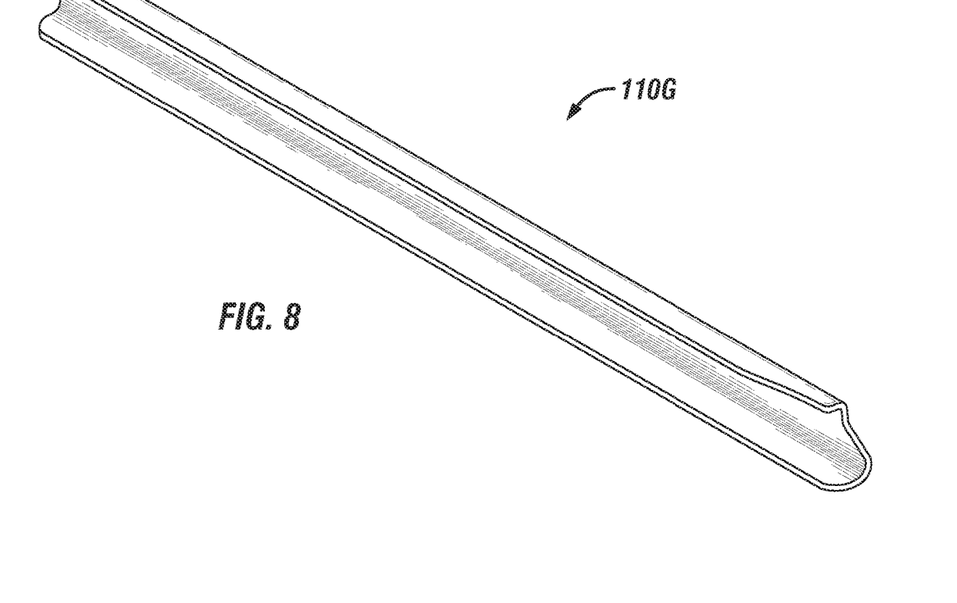
FIG. 8 shows an example of a stiffener that may be used on a side of body CFRP rib web.

As discussed herein, various stiffeners 110 may be used with the side of body CFRP rib assembly 100 such as, but not limited to, the stiffeners shown in FIGS. 3-8. FIG. 3 shows an aluminum T-shaped stiffener 110B having an aft flange 111 and a forward flange 112. FIG. 4 shows an aluminum J-shaped stiffener 110A. FIG. 5 shows a thermoset or thermoplastic stiffener 110C that is comprised of two L-shaped stiffeners 110E connected to a Z-shaped stiffener 110D. FIG. 6 shows a thermoset or thermoplastic Z-shaped stiffener 110D. FIGS. 7A and 7B show an aluminum Z-shaped stiffener 110F. FIG. 8 shows a C-channel shaped stiffener 110G.

Figure 9:
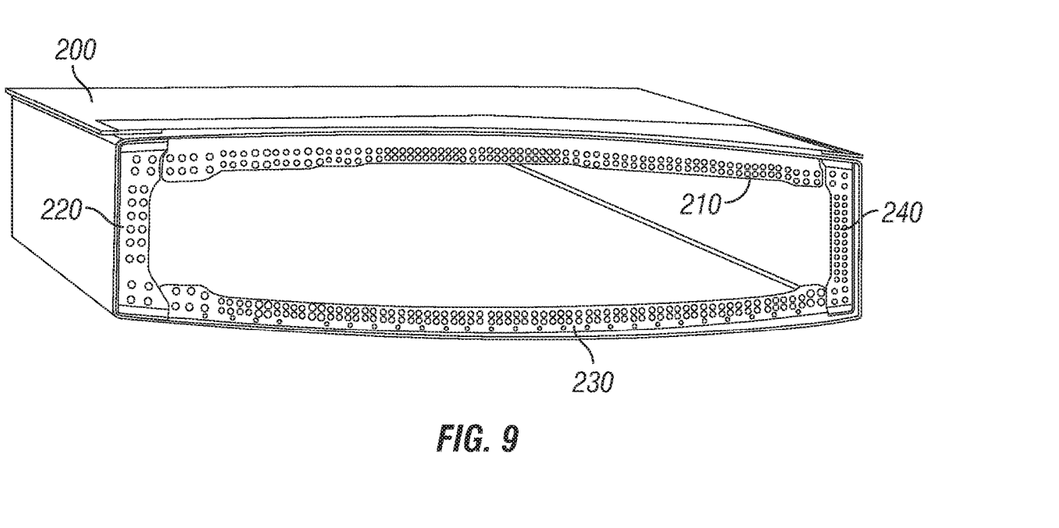
FIG. 9 is a schematic showing an upper chord, a lower chord, a rear spar fitting, and a front spar fitting connected to a CFRP wing box.

FIG. 9 shows an example of a CFRP wing box 200. The wing box 200 includes an upper chord 210, a rear spar fitting 220, a lower chord 230, and a forward spar fitting 240. The upper chord 210, a rear spar fitting 220, a lower chord 230, and a forward spar fitting 240 may be used to connect the side of body CFRP rib assembly 100 to the wing box 200.

Figure 10:
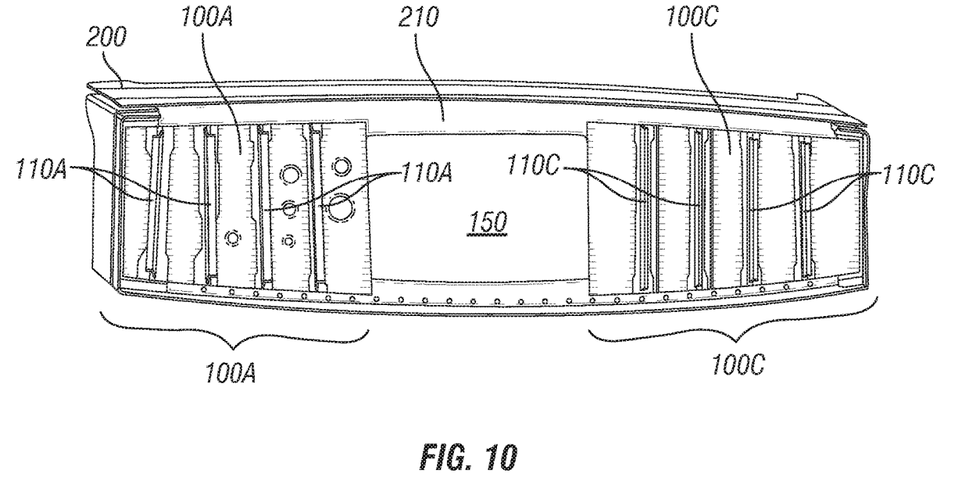
FIG. 10 is a schematic showing an aft CFRP rib web connected to the upper chord, lower chord, and rear spar fitting of FIG. 9 and a forward CFRP rib web connected to the upper chord, lower chord, and forward spar fitting of FIG. 9.

FIG. 10 shows the aft CFRP rib web 100A connected to the wing box 200 via a portion of the upper chord 210, the rear spar fitting 220, and a portion of the lower chord 230. Likewise, the forward CFRP rib web 100C is connected to the wing box 200 via a portion of the upper chord 210, the forward spar fitting 240, and a portion of the lower chord 230. Aluminum J-shaped stiffeners 110A are connected to the aft CFRP rib web 100A. Thermoset or thermoplastic stiffeners 110C are connected to the forward CFRP rib web 100C. The thermoset or thermoplastic stiffeners 110C may be Z-shaped stiffeners 110D (shown in FIG. 6), L-shaped stiffeners 110E connected to a Z-shaped stiffener 110D (shown in FIG. 5), or another shape of stiffener. As discussed herein, fasteners 300 may connect the aft CFRP rib web 100A and the forward CFRP rib web 100C, respectively, to the upper chord 210, the rear spar fitting 220, the lower chord 230, and the forward spar fitting 240. The aft CFRP rib web 100A and the forward CFRP rib web 100C may be connected to the wing box 200 prior to the installation of a middle CFRP rib web 100B providing an opening 150 that may enable installers to move between either side of the installed aft and forward CFRP rib webs 100A, 100C.

Figure 11:
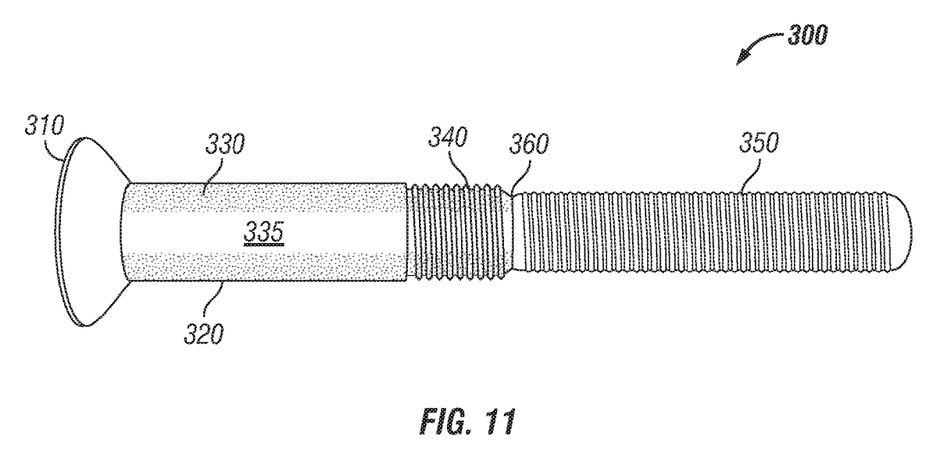
FIG. 11 shows an example of a fastener that may be used to connect a side of body CFRP rib web to a CFRP wing box.

FIG. 11 shows an example of an interference fit fastener 300 that may be used to connect the side of body CFRP rib assembly 100 to a wing box 200. The fastener 300 includes a head 310 and a shank 320 extending from the head. The shank 320 includes a threaded portion 340. A second portion 350 may extend from the threaded portion 340. This second portion 350 may aid the insertion of the fastener 300 through an opening. After insertion, the second portion 350 may be snapped or broken from the threaded portion 340 at a portion 360 configured to enable the second portion 350 to be removed from the fastener 300. A portion of the shank 320 of the fastener 300 may include a coating 330 configured for electromagnetic effect as would be appreciated by one of ordinary skill in the art having the benefit of this disclosure. For example, the shank 320 may include stripes of coating 330 separated by non-coated portions 335 of the shank 320.

Figure 12:
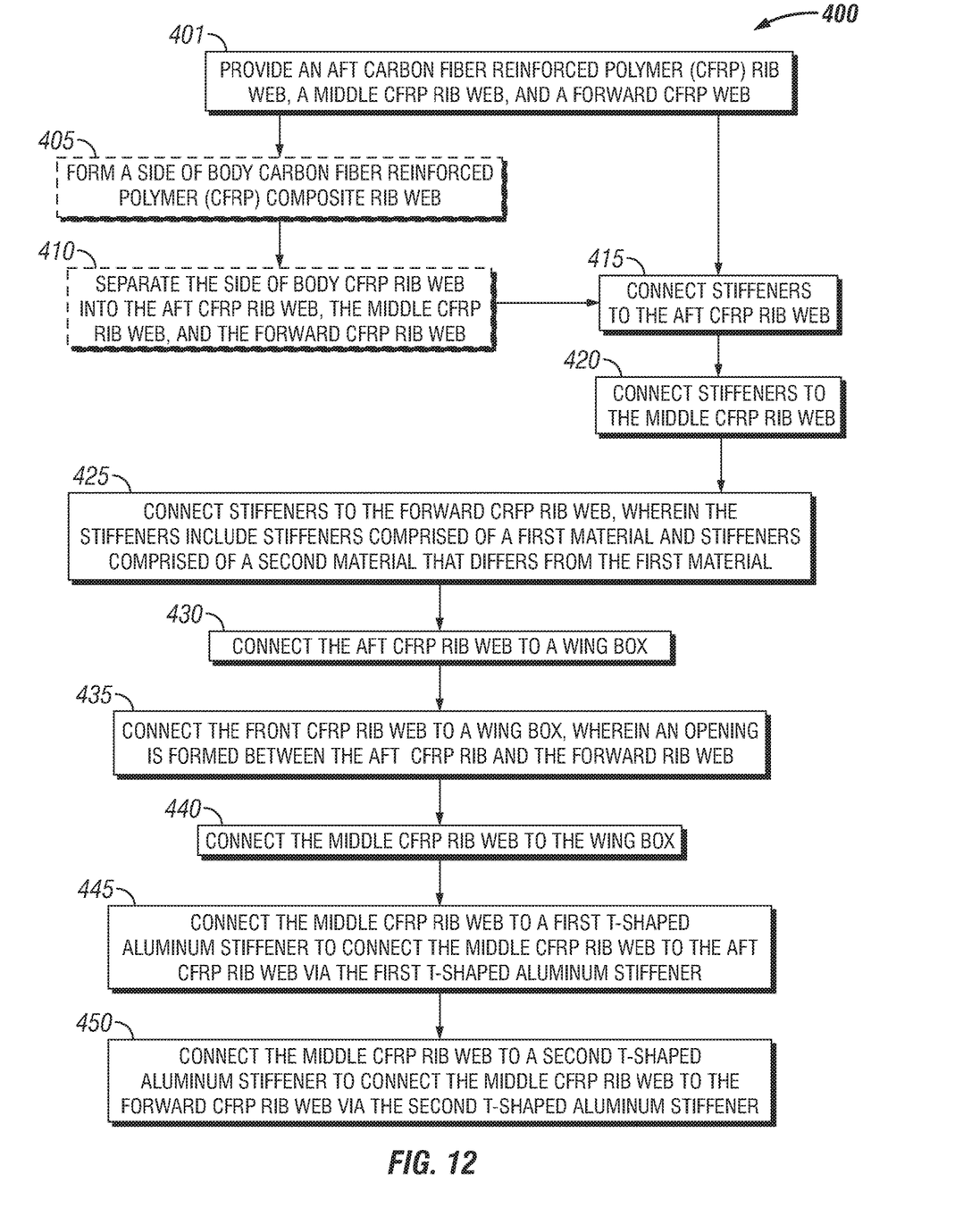
FIG. 12 is a flow chart of an example method disclosed herein.

FIG. 12 is a flow chart of a method 400 of the present disclosure. The method 400 includes providing an aft carbon fiber reinforced polymer (CFRP) rib web, a middle CFRP rib web, and a forward CFRP rib web, at 401. Various process may be used to provide the aft CFRP rib web, the middle CFRP rib web, and the forward CFRP rib web. For example, the method 400 may include forming a side of body CFRP rib web, at 405, and separating the side of body CFRP rib web into the aft CFRP rib web, the middle CFRP rib web, and the forward CFRP rib web, at 410. Alternatively, the aft CFRP rib web 100A, the middle CFRP rib web 100B, and the forward CFRP rib web 100C may be formed separately and then connected to a wing box to form a side of body CFRP rib assembly as discussed herein. The method 400 includes connecting stiffeners to the aft CFRP rib web, at 415. The method 400 includes connecting stiffeners to the middle CFRP rib web, at 420. The method 400 includes connecting stiffeners to the forward CFRP rib web, wherein the stiffeners include stiffeners comprising of a first material and stiffeners comprised of a second material that differs from the first material, at 425.

The method 400 may include connecting the aft CFRP rib web to a wing box, at 430. The method 400 may include connecting the forward CFRP rib web to the wing box, wherein an opening is formed between the aft CFRP rib web and the forward CFRP rib web, at 435. The method 400 may include connecting the middle CFRP rib web to the wing box, at 440. The method 400 may include connecting the middle CFRP rib web to a first T-shaped aluminum stiffener to connect the middle CFRP rib web to the aft CFRP rib web via the first T-shaped aluminum stiffener, at 445. The method 400 may include connecting the middle CFRP rib web to a second T-shaped aluminum stiffener to connect the middle CFRP rib web to the forward CFRP rib web via the second T-shape aluminum stiffener, at 450.

Although this disclosure has been described in terms of certain embodiments, other embodiments that are apparent to those of ordinary skill in the art, including embodiments that do not provide all of the features and advantages set forth herein, are also within the scope of this disclosure. Accordingly, the scope of the present disclosure is defined only by reference to the appended claims and equivalents thereof

What is claimed is:

1. An apparatus comprising:
an aft carbon fiber reinforced polymer (CFRP) composite rib web;
a middle CFRP rib web;
a forward CFRP rib web;
a plurality of stiffeners, wherein individual stiffeners of the plurality of stiffeners are connected to the aft CFRP rib web, the middle CFRP rib web, or the forward CFRP rib web; and
wherein the aft CFRP rib web and the middle CFRP rib web are connected to a first stiffener of the plurality of stiffeners and the middle CFRP rib web and the forward CFRP rib web are connected to a second stiffener of the plurality of stiffeners, wherein the first stiffener is a first aluminum T-shaped stiffener having a first aft flange and a first forward flange with fasteners that connect the aft CFRP rib web to the first aft flange and fasteners that connect the middle CFRP rib web to the first forward flange, the second stiffener is a second aluminum T-shaped stiffener having a second aft flange and a second forward flange with fasteners that connect the middle CFRP rib web to the second aft flange and fasteners that connect the forward CFRP rib web to the second forward flange.

2. The apparatus of claim 1, wherein the individual stiffeners of the plurality of stiffeners are connected to the aft CFRP rib web, the middle CFRP rib web, or the forward CFRP rib web via fasteners, being co-bonded to the aft CFRP rib web, the middle CFRP rib web, or the forward CFRP rib web, or being co-cured with the aft CFRP rib web, the middle CFRP rib web, or the forward CFRP rib web.

3. The apparatus of claim 1, wherein the fasteners are interference fit fasteners, an exterior of the interference fit fasteners including stripes of coating separated by non-coated stripes.

4. The apparatus of claim 1, the side of body CFRP rib assembly having a longitudinal length, wherein each of the plurality of stiffeners is substantially perpendicular to the longitudinal length.

5. The apparatus of claim 4, wherein the plurality of stiffeners includes stiffeners comprised of a first material and stiffeners comprised of a second material that differs from the first material.

6. The apparatus of claim 5, wherein the first material is aluminum and the second material is a thermoset or a thermoplastic.

7. The apparatus of claim 6, wherein the aluminum stiffeners include T-shaped stiffeners and J-shaped stiffeners and the thermoplastic or thermoset stiffeners comprise Z-shaped stiffeners.

8. The apparatus of claim 7, wherein the thermoplastic or thermoset stiffeners further comprise L-shaped stiffeners connected to Z-shaped stiffeners.

9. The apparatus of claim 4, wherein the plurality of stiffeners includes at least a first shape and a second shape.

10. The apparatus of claim 9, wherein the first shape is a J-shaped stiffener and the second shape is a T-shaped stiffener.

11. A system comprising:
a carbon fiber reinforced polymer (CFRP) composite wing box;
a side of body CFRP rib assembly having a longitudinal length connected to the CFRP wing box, the side of body CFRP rib assembly comprising an aft CFRP rib web connected to a middle CFRP rib web connected to a forward CFRP rib web;
a plurality of stiffeners connected to the side of body CFRP rib assembly, wherein individual stiffeners of the plurality of stiffeners are substantially perpendicular to the longitudinal length;
wherein the plurality of stiffeners further comprises:
aluminum J-shaped stiffeners are connected to the aft CFRP rib web;
a first aluminum T-shaped stiffener connected to both the aft CFRP rib web and the middle CFRP rib web;
a second aluminum T-shaped stiffener connected to both the middle CFRP rib web and the forward CFRP rib web;
thermoplastic stiffeners connected to the middle CFRP rib web; and
thermoplastic stiffeners connected to the forward CFRP rib web.

12. The system of claim 11, further comprising:
an upper chord connected to the CFRP wing box;
a lower chord connected to the CFRP wing box;
a rear spar fitting connected to the CFRP wing box;
a front spar fitting connected to the CFRP wing box;
wherein the aft CFRP rib web is connected to the CFRP wing box via being connected to the upper chord, the rear spar fitting, and the lower chord;
wherein the middle CFRP rib web is connected to the CFRP wing box via being connected to the upper chord and the lower chord; and
wherein the forward CFRP rib web is connected to the CFRP wing box via being connected to the upper chord, the front spar fitting, and the lower chord.

13. The system of claim 12, further comprising:
a plurality of interference fit fasteners having an exterior that has stripes of coating separated by non-coated stripes;
wherein a first portion of the plurality of interference fit fasteners connect the aft CFRP rib web to the upper chord, the rear spar fitting, and the lower chord;
wherein a second portion of the plurality of interference fit fasteners connect the middle CFRP rib web to the upper chord and the lower chord; and
wherein a third portion of the plurality of interference fit fasteners connect the forward CFRP rib web to the upper chord, the front spar fitting, and the lower chord.

14. The system of claim 11, wherein the thermoplastic stiffeners comprise Z-shaped stiffeners or C-channel shaped stiffeners.

15. The system of claim 11, wherein the thermoplastic stiffeners further comprise L-shaped stiffeners connected to Z-shaped stiffeners.

16. A method comprising:
providing an aft carbon fiber reinforced polymer (CFRP) rib web, a middle CFRP rib web, and a forward CFRP rib web;
connecting stiffeners to the aft CFRP rib web;
connecting stiffeners to the middle CFRP rib web; and
connecting stiffeners to the forward CFRP rib web, wherein the stiffeners include stiffeners comprised of a first material and stiffeners comprised of a second material that differs from the first material;
wherein providing an aft CFRP rib web, a middle CFRP rib web, and a forward CFRP rib web further comprises:
forming a side of body carbon fiber reinforced polymer (CFRP) composite rib web; and
separating the side of body CFRP rib web into the aft CFRP rib web, the middle CFRP rib web, and the forward CFRP rib web.

17. The method of claim 16, wherein the stiffeners further comprise thermoplastic Z shaped stiffeners.

18. The method of claim 16, wherein the stiffeners further comprise thermoplastic L shaped stiffeners connected to thermoplastic Z-shaped stiffeners.

19. A method comprising:
   providing an aft carbon fiber reinforced polymer (CFRP) rib web, a middle CFRP rib web, and a forward CFRP rib web;
   connecting stiffeners to the aft CFRP rib web;
   connecting stiffeners to the middle CFRP rib web;
   connecting stiffeners to the forward CFRP rib web, wherein the stiffeners include stiffeners comprised of a first material and stiffeners comprised of a second material that differs from the first material;
   connecting the aft CFRP rib web to a wing box; and
   connecting the forward CFRP rib web to the wing box, wherein an opening is formed between the aft CFRP rib web and the forward CFRP rib web.

20. The method of claim 19, further comprising:
   connecting the middle CFRP rib web to the wing box;
   connecting the middle CFRP rib web to a first T-shaped aluminum stiffener to connect the middle CFRP rib web to the aft CFRP rib web via the first T-shaped aluminum stiffener; and
   connecting the middle CFRP rib web to a second T-shaped aluminum stiffener to connect the middle CFRP rib web to the forward CFRP rib web via the second T-shape aluminum stiffener.

* * * * *